Patented Feb. 6, 1934

1,945,584

UNITED STATES PATENT OFFICE 1,945,584

PROTECTIVE PAINT OR LACQUER FOR FOOD CONTAINERS

Alberto Williams, Buenos Aires, Argentina, assignor to Swift and Company, Chicago, Ill.

No Drawing. Application May 21, 1932, Serial No. 612,871, and in Argentina September 29, 1931

5 Claims. (Cl. 134—26)

This description refers to a new paint or protective preparation for metallic containers in general and especially for metallic containers intended to be used for food substances or preserves.

Different lacquers or paints have been devised for the protection of metallic containers, but all the preparations that are used at present, suffer the defect of being too brittle, of chipping and falling on the food when the container is opened, which, besides being unhygienic, may be dangerous to health, depending on the origin of the coloring matters employed.

The lacquer or paint which I desire to protect by this application, has the following advantages:

1. It is not brittle, thus doing away with the objectionable feature mentioned.
2. When dry, it remains brilliant, thus giving the container an attractive appearance.
3. It dries more rapidly than any other paint at present in use.
4. It is perfectly adhesive and waterproof.
5. Containers having a ring or strip of rubber for sealing, do not suffer any damage as the protective preparation does not attack rubber.

The protective paint is prepared as follows:

*Denatured alcohol.*—This alcohol must be prepared by adding 3% of shellac and 3% of rosin and allowing them to dissolve gradually by suspending them on a perforated stockinette lined tray in the alcohol.

*Shellac stock solution.*—To be prepared in a wooden cask of 800 liters capacity equipped with a removable steam coil. 600 liters of denatured alcohol should be lowered into the cask and 22.2 kilos of shellac placed in the suspended tray. By next morning the shellac will be found to have dissolved to a turbid solution. Remove the empty tray, place the steam coil in the bottom of the cask and heat the solution to 50° C. (122° F.), keeping this cask covered with a tight fitting cover. Once this temperature has been reached, remove the steam coil and allow the solution to settle out for 24 hours, after which pass it without disturbing the settlings to another cask which acts as the holding vat for the finished shellac stock solution. The settlings to be filtered through a thick layer of cloth and the filtrate to be poured into the stock solution.

*Rosin stock solution.*—To be prepared in exactly the same way as described for the shellac stock solution, using the same quantities, i. e. 600 liters of denatured alcohol and 22.2 kilos of rosin broken up so that none of the pieces measure one to one and a half inches square.

*Mixing paint*

(1) *Gold lacquer.*—Transfer 300 liters of the shellac stock solution and 300 liters of the rosin stock solution to an 800 liter wooden cask and mix well. Draw about 15 liters of the mixture off into a bucket and stir 1 kilo 950 grammes of Sudan yellow RR aniline into the liquid until no lumps remain. Pour the paste into the cask and rinse the bucket three times with the paint from the cask adding 3 kilos 900 grammes of castor oil to the second rinse and stirring well to dissolve. Mix the contents of the cask well. Keep the cask well covered.

(2) *Blue lacquer.*—Transfer 300 liters of shellac stock solution and 300 liters of rosin stock solution to an 800 liters wooden cask and mix well. Draw about 15 liters of the mixture off into a bucket and stir 2 kilos 880 grammes of Victoria blue B base aniline into the liquid until no lumps remain. Pour the paste into the cask and rinse the bucket three times with the paint from the cask adding 3 kilos 900 grammes of castor oil to the second rinsing and stirring well to dissolve. To the paint in the cask add 60 liters of gold lacquer and mix well. Keep the cask well covered.

The nature of my invention, and the manner of carrying it out, having been described and specified, what I claim as of my own exclusive invention and property, is:

1. The method of preparing lacquer for protecting metallic food containers which comprises denaturing alcohol by dissolving therein three per cent shellac and three per cent rosin, dissolving in said denatured alcohol a quantity of shellac in the proportion of approximately 22.2 kilos of shellac to 600 liters of denatured alcohol, after the shellac has been dissolved heating the solution to approximately 50 degrees centigrade, then permitting to cool and settle, decanting the shellac stock solution from the settlings, similarly preparing a rosin stock solution by dissolving approximately 22.2 kilos in 600 liters of denatured alcohol, heating the solution to a temperature of 50 degrees centigrade, cooling and settling and then denaturing the rosin stock solution, thereafter mixing the rosin stock solution and shellac stock solution and dividing in two equal quantities, mixing gold color and castor oil in one lot of the stock solution mixture and blue color and castor oil in the other lot of stock solution and thereafter adding gold lacquer to the blue lacquer in a ratio of 1 to 5.

2. The method of preparing lacquer for metallic food containers which comprises dissolving shellac and rosin in alcohol which has been denatured with shellac and rosin, heating the solution to a temperature sufficiently high and for a sufficient length of time to totally dissolve the soluble portion of a quantity of approximately 22.2 kilos shellac and rosin in 300 liters denatured alcohol, removing settlings and mixing appropriate quantities of pigment and oil with the solution.

3. The method of preparing lacquer for metallic food containers which comprises dissolving shellac and rosin in alcohol which has been denatured with shellac and rosin, heating the solution to a temperature of approximately 50 degrees centigrade for a sufficient length of time to totally dissolve the soluble portion of a quantity of approximately 22.2 kilos shellac and rosin in 300 liters denatured alcohol, removing settlings and mixing appropriate quantities of pigment and oil with the solution.

4. The method of preparing lacquer for metallic food containers which comprises dissolving shellac and rosin in alcohol which has been denatured with shellac and rosin, heating the solution to a temperature of approximately 50 degrees centigrade to totally dissolve the soluble portion of a quantity of approximately 22.2 kilos shellac and rosin in 300 liters denatured alcohol, removing settlings and mixing appropriate quantities of pigment and oil with the solution.

5. In the preparation of protective lacquers for containers, the method which comprises the step of dissolving shellac and rosin in alcohol by suspending the shellac and rosin in the alcohol on a porous tray positioned close to the surface of the alcohol.

ALBERTO WILLIAMS.